(12) United States Patent
Man-ho

(10) Patent No.: US 6,980,441 B2
(45) Date of Patent: Dec. 27, 2005

(54) CIRCUIT AND METHOD FOR CONTROLLING A SYNCHRONOUS RECTIFIER IN A POWER CONVERTER

(75) Inventor: Chiang Man-ho, Tsing Yi (HK)

(73) Assignee: Astec International Limited, Hong Kong (HK)

( * ) Notice: Subject to any disclaimer, the term of this patent is extended or adjusted under 35 U.S.C. 154(b) by 123 days.

(21) Appl. No.: 10/628,989

(22) Filed: Jul. 28, 2003

(65) Prior Publication Data

US 2005/0024896 A1 Feb. 3, 2005

(51) Int. Cl.⁷ .............................................. H02M 3/335
(52) U.S. Cl. .................................. 363/21.06; 363/21.14
(58) Field of Search ........................... 363/21.01, 21.04, 363/21.06, 21.1, 21.11, 21.12, 21.14, 21.18, 127

(56) References Cited

U.S. PATENT DOCUMENTS

| | | | |
|---|---|---|---|
| 4,922,404 A | 5/1990 | Ludwig et al. | 363/89 |
| 5,336,985 A | 8/1994 | McKenzie | 323/266 |
| 5,402,329 A | 3/1995 | Wittenbreder, Jr. | 363/16 |
| 5,552,695 A | 9/1996 | Schwartz | 323/271 |
| 5,636,116 A | 6/1997 | Milavec et al. | 363/89 |
| 6,100,677 A | 8/2000 | Farrenkopf | 323/285 |
| 6,128,206 A | 10/2000 | Sun et al. | 363/127 |
| 6,181,578 B1 | 1/2001 | Fronk | 363/21 |
| 6,191,964 B1 | 2/2001 | Boylan et al. | 363/89 |
| 6,204,648 B1 | 3/2001 | Saeki et al. | 323/282 |
| 6,396,333 B2 | 5/2002 | Dubhashi et al. | 327/424 |
| 6,414,861 B1 | 7/2002 | Matsumoto et al. | 363/56.1 |
| 6,430,070 B1 | 8/2002 | Shi et al. | 363/97 |
| 6,459,600 B2 | 10/2002 | Farrington et al. | 363/89 |
| 2002/0001204 A1 * | 1/2002 | Lentini et al. | 363/21.06 |

OTHER PUBLICATIONS

Orr, et al., "An Implementation of Synchronous Rectifiers in a Power Converter Designed for use in Parallel Operation", Power Conversion, pp. 220–231 (Oct. 1990).

* cited by examiner

Primary Examiner—Jessica Han
(74) Attorney, Agent, or Firm—Coudert Brothers LLP

(57) ABSTRACT

A control circuit and corresponding method, particularly for power converters in a system having paralleled power converters, for rapidly and efficiently controlling a free-wheeling synchronous rectifier, so as to prevent any large negative current flow that might cause damage to components of the converter during a fault condition where the PWM signal turns off or has missing cycles. Preferably, clock signal and the gate drive output of a PWM controller are compared in order to recognize a failure condition and to rapidly provide control of the synchronous rectifier so as to prevent the large negative current flow. Control of the free-wheeling synchronous rectifier is provided in a way that is dependent on the gate drive output of the PWM controller and independent of timing, current sense signals, voltage sense signals, the current share system, and the operation of the forward synchronous rectifier of the power converter.

25 Claims, 7 Drawing Sheets

CIRCUIT AND METHOD FOR CONTROLLING A SYNCHRONOUS RECTIFIER IN A POWER CONVERTER

FIELD OF INVENTION

The present invention relates to power converters, and more particularly, to a circuit and corresponding method that controls a synchronous rectifier in a power converter.

BACKGROUND OF THE INVENTION

One way to increase power efficiency in a power converter is through the use of synchronous rectifiers to replace conventional freewheeling diodes. A feature of DC-DC power converters having synchronous rectification is that current is enabled to flow not only to the output terminals through the synchronous rectifier, but also in a reverse direction from the output terminals back into the converter.

FIG. 1 is a schematic diagram of a prior art power converter 10 described in U.S. Pat. No. 6,181,578, issued Jan. 30, 2001, entitled "Synchronous Rectifier Drive Mechanism for Resonant Reset Forward Converters", commonly assigned and incorporated by reference herein. As seen in FIG. 1, power converter 10 is a resonant reset forward converter including a gate drive mechanism for controlling the conduction periods of a free-wheeling synchronous rectifier on the secondary side of the converter. A power switch 16 is connected in series with the primary winding 13 of a transformer 12 at node 102. The primary winding 13 of the transformer 12 and the power switch 16 are connected across an input DC voltage source 11. The power switch 16 is alternately switched between an on period and an off period in response to a pulse width modulated (PWM) signal applied to the control gate of the power switch 16 by a PWM generator (not shown). The alternating states of the power switch 16 causes an AC voltage to be generated across the secondary winding 14 of the transformer 12. The signal provided by the PWM is generated in response to a feedback signal from a feedback loop (not shown) which is coupled across the output terminals $V_{out1}$ and $V_{out2}$ of the converter 10 and is responsive to the output voltage of the converter 10.

On the secondary side of the forward converter 10, the secondary winding 14 of the transformer 12 is coupled to a positive voltage rail at node 201 and a negative voltage rail at node 202. A forward rectifier 112 is coupled between the secondary winding 14 of the transformer 12 and the secondary side ground. The forward rectifier 112 is typically a MOSFET having a source, a drain, and a gate. The gate of the forward rectifier 112 is coupled to node 201. The drain of the forward rectifier 112 is coupled to node 202. The source of the forward rectifier 112 is coupled to the secondary side ground. The forward rectifier 112 provides a forward conduction path between the secondary winding 14 (at node 202) and the second output terminal of the converter 10 ($V_{out2}$).

A free-wheeling synchronous rectifier 116 is coupled between node 201 and the source of the forward rectifier 112. In an exemplary embodiment, the free-wheeling synchronous rectifier 116 is a MOSFET having a source, a drain, and a gate. The drain of the free-wheeling synchronous rectifier 116 is coupled to node 201. The source of the free-wheeling synchronous rectifier 116 is coupled to a shoot-through inductor 118. The control gate of the free-wheeling synchronous rectifier 116 is connected to a secondary side diode 115. The secondary side diode 115 has an anode connected to the drain of the forward rectifier 112. The cathode of the secondary side diode 115 is connected to the gate of the free-wheeling synchronous rectifier 116. The free-wheeling synchronous rectifier 116 is operative to provide a current path between the positive voltage rail and the output terminal $V_{OUT2}$ when turned on by application of a suitable charge to its gate.

A quench FET 114 is coupled between the gate of the free-wheeling synchronous rectifier 116 and the secondary side ground and is operative to rapidly turn-off of the free-wheeling synchronous rectifier 116 at the beginning of the forward power cycle of the converter 10. In one exemplary embodiment, the drain of the quench FET 114 is coupled to the gate of the free-wheeling synchronous rectifier 116 and the cathode of the secondary side diode 115 at node 117. The source of the quench FET 114 is connected to the secondary side ground. The gate of the quench FET 114 is connected to the positive voltage rail at node 201. With this configuration, the free-wheeling synchronous rectifier 116 is maintained in a high impedance state, i.e., a non-conducting state, when the power switch 16 is turned on and the forward converter 10 is in the forward power cycle.

The shoot-through inductor 118: (1) initiates the discharging of the inherent drain to source capacitance, $C_{ds}$, of the free-wheeling rectifier 116 at the beginning of each forward power cycle; and (2) reduces the gate to source voltage, $V_{gs}$, across free-wheeling rectifier 116 during this transition, thereby causing the free-wheeling rectifier 116 to rapidly turn off. The quench FET 114 finishes the discharging of the free-wheeling rectifier 116 by shunting the charge present on the gate of the free-wheeling rectifier 116 to ground at the beginning of the forward power cycle. Discharging the gate of the free-wheeling rectifier 116 at the beginning of the forward power cycle prevents a large simultaneous current flow through the forward rectifier 112 and the free-wheeling rectifier 116.

An output filter 100, consisting of a filter inductor 120 connected in series to a filter capacitor 122, is coupled across the output terminals $V_{out1}$ and $V_{out2}$ of the converter 10. The output filter 100 filters out any high frequency components of the ripple current present along the positive voltage rail and provides a substantially ripple free, substantially constant DC output voltage $V_o$ across the output terminals of the forward converter 10. Also shown coupled across the output terminals of the forward converter is an exemplary load, $R_{LOAD}$.

Consequently, the gate drive mechanism shown in FIG. 1 is operative to turn on the free-wheeling synchronous rectifier at the beginning of the forward power cycle, maintain the free-wheeling rectifier in the on state during the transformer core reset and dead periods, and provide for rapid discharging of the freewheeling rectifier at the beginning of a subsequent forward power cycle.

A disadvantage of the forward converter shown in FIG. 1 is that the gate charge of the free-wheeling synchronous rectifier cannot be fully discharged quickly when the PWM signal turns off or has missing cycles due to a failure condition. As a result, a large negative current, which reflects to the primary main power switch via the power transformer, is enabled to flow in a reverse direction from the output terminals back into the converter through the free-wheeling synchronous rectifier.

The bi-directional current flowing capability of the synchronous rectifier may pose a serious problem, i.e., a large negative current flow could result in the destruction of the freewheeling synchronous rectifier or primary power MOS- FET when such rectifiers are used in paralleled power converters having a shared output bus, unless an ORing diode is used to protect each power converter. In other words, although the paralleling of power converters provides a way for two or more individual, small, high density power converter modules to supply the higher power required by current generation loads and/or to provide redundancy, this topology also enables the current share bus to couple back into the converter an uncontrolled amount of current when the free-wheeling synchronous rectifier is conducting.

FIG. 2 is a block diagram of a system of parallel converters (also referred to herein as "power modules"). For the paralleled converter configuration shown in FIG. 2, power is supplied to a common output voltage bus and thereby to a load. As shown in FIG. 2, power module 1, power module 2, . . . power module N are each coupled to a single power output port 25 for supplying power to a load. An exemplary load 26 is shown coupled to output port 25 of system 20. In a preferred embodiment, power is supplied to power modules 1 through N at a single power input port 22. It will be recognized by those skilled in the art that it is not necessary that power be supplied to power modules 1 through N at a single power input port. Rather, each power module may receive power from a separate power source such as separate AC-DC converters (not shown). Each power module in system 20 has a parallel pin 24 and, as shown in FIG. 2, the parallel pins 24 of power modules 1 through N are all coupled to each other via a bus 28.

Although any large negative current flow may pose serious problems, an advantage of the bi-directional current flowing capability of the synchronous rectifier in a power converter is that, by enabling a small negative current flow, the transient response stepping from full load to zero load is increased because the negative current aids in the discharge of the output voltage.

Conventional circuits for controlling the free-wheeling synchronous rectifier to prevent negative current flow are dependent on one or more of the following: the timing, current sense signals, voltage sense signal, the current share system, and the operation of the forward synchronous rectifier.

A need therefore exists for providing a circuit and method for controlling the free-wheeling synchronous rectifier in a power converter for preventing any large negative current flow during any fault condition and to do so in a circuit and using a corresponding method that is independent of timing, current sense and voltage sense signals, the current share system, and the operation of the forward synchronous rectifier, but is dependent solely on a PWM gate drive output. There is a particular need to provide such a circuit and corresponding method for power converters in a system having paralleled power converters.

SUMMARY OF THE INVENTION

The present invention solves the problems of prior art converters by providing, particularly for power converters in a system having paralleled power converters, a control circuit and corresponding method that rapidly and efficiently controls the free-wheeling synchronous rectifier, so as to prevent any large negative current flow that might cause damage to components of the converter during a fault condition where the PWM signal turns off or has missing cycles.

The control circuit and corresponding method of the embodiments of the present invention compare the main clock signal and the gate drive output of a PWM controller in order to recognize a failure condition and to rapidly provide control of the synchronous rectifier so as to prevent large negative current flow through the synchronous rectifier which may otherwise result in component damage.

Broadly stated, the present invention provides a forward converter, comprising a transformer having a primary winding and a secondary winding; a power switch connected in series with the transformer and coupled to an input power source, the power switch capable of being alternately switched between an on period and an off period as a function of a PWM signal comprising pulses generated by a PWM circuit and such that an AC voltage is generated across the secondary winding in response thereto; an output filter operative to provide a substantially constant DC voltage to an output load; a forward rectifier having a control input and being operative to provide a forward conduction path between the secondary winding and the output filter during the on period; a free-wheeling rectifier having a control input and being operative to provide a second conduction path for maintaining current to the output filter during the off period; and a control circuit coupled to the control input of the free-wheeling synchronous rectifier for controlling the state thereof, the control circuit receiving a clock signal varying between an upper voltage and a lower voltage and having a frequency equal to or greater than the PWM signal, comprising a reference circuit for generating a PWM reference signal by causing the trailing edge of the PWM signal to decrease in voltage at a predetermined rate such that the PWM reference signal drops below and remains below the lower voltage if the next pulse of the PWM signal has not been generated; a comparator circuit for comparing the PWM reference signal to the clock signal and for generating an output signal as a function thereof such that the output signal is on when the PWM reference signal is below the lower voltage; and a driver circuit responsive to the output signal and the PWM signal so as to turn off the free-wheeling synchronous rectifier when the output signal is on and so as to enable the PWM signal to control the free-wheeling synchronous rectifier when the output signal is off.

The present invention also provides a method of controlling the state of a synchronous rectifier in a power converter, the power converter having an input terminal to which an input DC voltage is coupled and an output terminal where the output DC voltage is provided, comprising the steps of: receiving a PWM signal generated by a PWM circuit; receiving a clock signal varying between an upper voltage and a lower voltage and having a frequency equal to or greater than the PWM signal; generating a PWM reference signal by causing the trailing edge of the PWM signal to decrease in voltage at a predetermined rate such that the PWM reference signal drops below and remains below the lower voltage if the next pulse of the PWM signal has not been generated; generating an output signal as a function of the PWM reference signal and the clock signal such that the output signal is on when the PWM reference signal is below the lower voltage; turning off the free-wheeling synchronous rectifier when the output signal is on; and enabling the PWM signal to control the free-wheeling synchronous rectifier when the output signal is off.

The present invention also provides a circuit and corresponding method for power converters in a system of paralleled power converters.

An advantage of the present invention is that it provides control of the free-wheeling synchronous rectifier so as to prevent any large negative current flow, and does so in a way that is dependent on the PWM controller gate drive output and independent of timing, current sense signals, voltage sense signals, the current share system, and the operation of the forward synchronous rectifier.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 1:
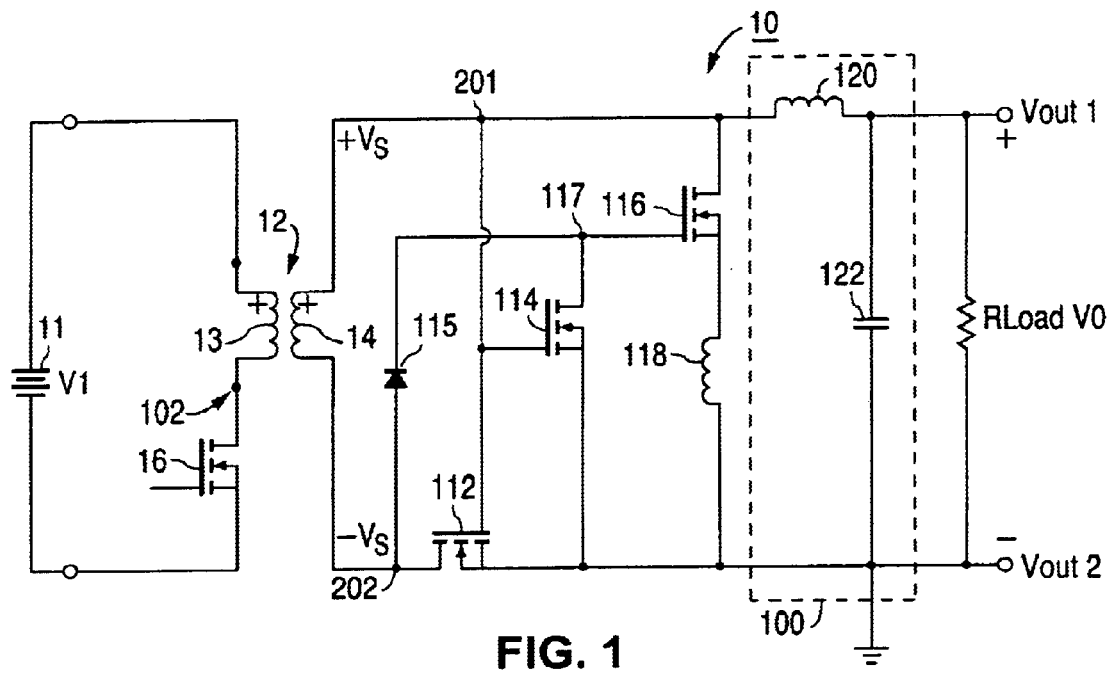
FIG. 1 is a schematic diagram of a prior art forward converter that includes synchronous rectification.
Figure 2:
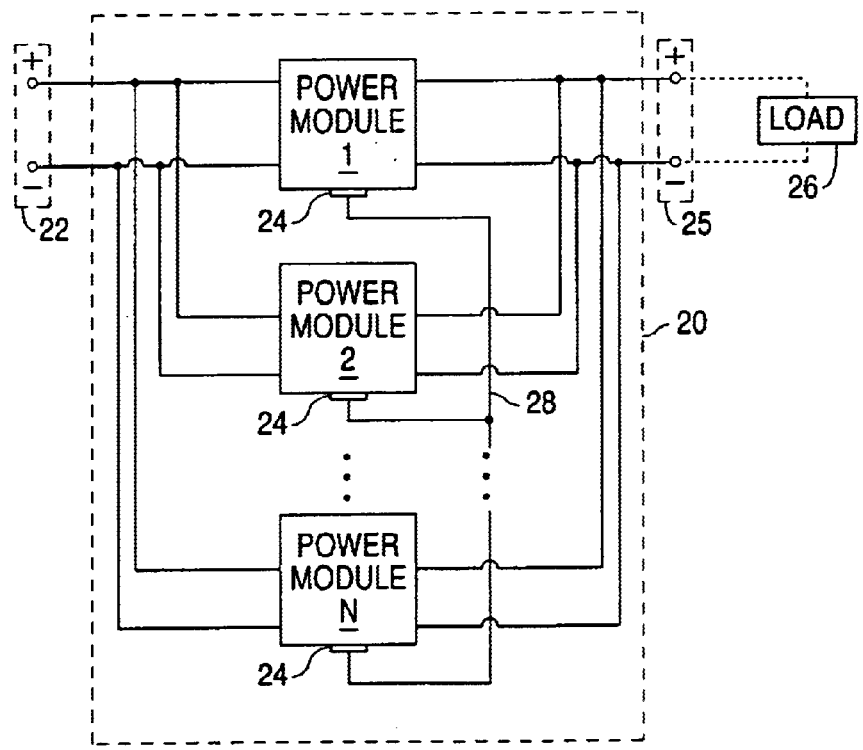
FIG. 2 is a block diagram of a system of parallel converters.
Figure 3:
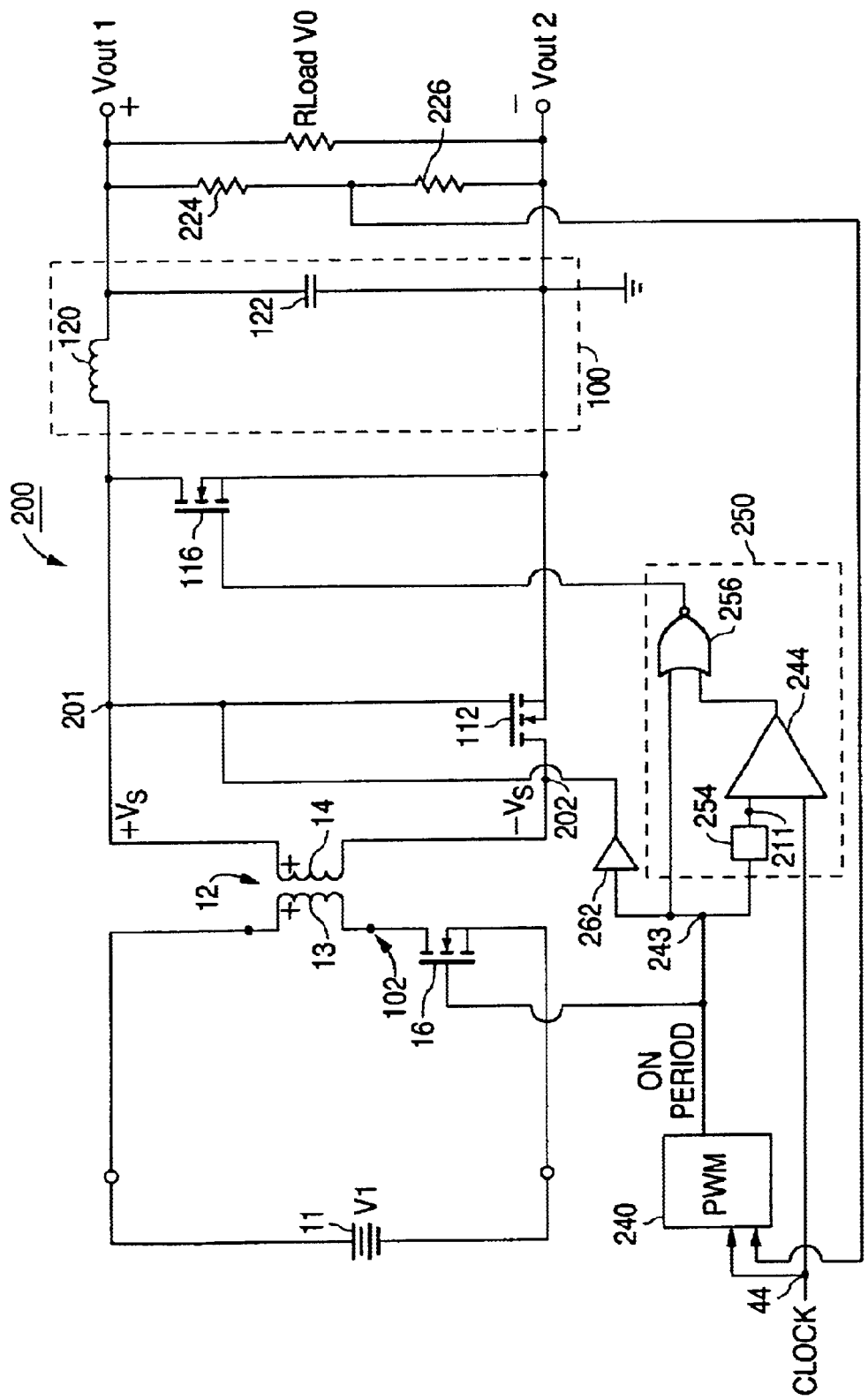
FIG. 3 is a schematic diagram of a forward converter having a control circuit according to a first embodiment of the present invention.

The present invention overcomes the drawbacks of known prior art converters. A first embodiment of each converter in a paralleled system of converters is shown in FIG. 3. As seen in FIG. 3, converter 200 includes a power switch 16 connected in series with the primary winding 13 of a transformer 12 at node 102. The primary winding 13 of the transformer 12 and the power switch 16 are connected across an input DC voltage source 11. The power switch 16 is alternately switched between an on period and an off period in response to a PWM signal, at node 243, applied to the control gate of the power switch 16 by a PWM controller 240. The alternating states of the power switch 16 causes an AC voltage to be generated across the secondary winding 14 of the transformer 12. The PWM signal provided by the PWM controller 240 is generated in response to a feedback signal. As seen in FIG. 2, the feedback signal coupled to the PWM controller 240 is generated by a conventional voltage divider formed by resistors 224 and 226 coupled to the output voltage, $V_o$, of the converter 200 and responsive thereto.

On the secondary side of the converter 200, the secondary winding 14 of the transformer 12 is coupled to a positive voltage rail at node 201 and a negative voltage rail at node 202. A forward rectifier 112 is coupled between the secondary winding 14 of the transformer 12 and the secondary side ground. The forward rectifier 112 is preferably a MOSFET having a source, a drain, and a gate. The gate of the forward rectifier 112 is coupled to node 201 and to a gate drive circuit 262 so as to enable its control by one or the other of these sources. The gate drive circuit is responsive to the PWM signal, at node 243, for turning on the forward rectifier 112 during the on period of the converter 200. The drain of the forward rectifier 112 is coupled to node 202. The source of the forward rectifier 112 is coupled to the secondary side ground. The forward rectifier 112 provides a forward conduction path between the secondary winding 14 (at node 202) and the second output terminal of the converter 10 ($V_{out2}$) during the on period of converter 200.

A free-wheeling synchronous rectifier 116 is coupled between node 201 and the source of the forward rectifier 112. Preferably, the free-wheeling synchronous rectifier 116 is a MOSFET having a source, a drain, and a gate. The drain of the free-wheeling synchronous rectifier 116 is coupled to node 201. The source of the free-wheeling synchronous rectifier 116 is coupled to the source of the forward rectifier 112. The free-wheeling synchronous rectifier 116 is operative to provide a current path between the positive voltage rail and the output terminal $V_{out2}$ when turned on by application of a suitable charge to its gate.

An output filter 100, comprising an inductor 120 connected in series with a capacitor 122, is coupled across the output terminals $V_{out1}$ and $V_{out2}$ of the converter 200. The output filter 100 filters out any high frequency components of the ripple current present along the positive voltage rail and provides a substantially ripple free, substantially constant DC output voltage $V_o$ across the output terminals of the forward converter 200. Also shown coupled across the output terminals of the forward converter is an exemplary load, $R_{LOAD}$.

A control circuit 250 is coupled to the gate of the free-wheeling synchronous rectifier 116. The control circuit 250 receives the PWM signal, at node 243, and a clock signal 44. The clock signal 44 is also input to the PWM controller 240. The clock signal 44 is provided by a source (not shown) and is preferably active when the input voltage, $V_1$, is applied. The clock signal 44 is preferably a triangular ramp clock signal, but any suitable square clock signal may also be used to practice the invention. The clock signal varies between an upper voltage and a lower voltage and has a frequency equal to or greater than the PWM signal.

Under normal operation of converter 200, the PWM controller 240 should generate the next pulse of the PWM signal in response to the feedback signal from the voltage divider, formed by the resistors 224 and 226, connected across the output terminals of converter 200. During a fault condition where the PWM signal turns off or has missing cycles, the next pulse will not be generated as required to maintain the operation of the converter 200.

The control circuit 250 includes a reference circuit 254 for generating a PWM reference signal. The reference circuit 254 generates the PWM reference signal at node 211 by causing the trailing edge of the PWM signal, at node 243, to decrease in voltage at a predetermined rate such that the PWM reference signal drops below, and remains below, the lower voltage of the clock signal 44 if the next pulse of the PWM signal has not been generated.

The control circuit 250 includes a comparator circuit 244 for comparing the PWM reference signal, at node 243, to the clock signal 44. An output signal is generated at the output of comparator 244 as a function of the PWM reference signal and the clock signal 44 such that the output signal is on when the PWM reference signal is below the lower voltage of the clock signal 44. The control circuit 250 includes a driver circuit 256, shown schematically as a NOR gate in FIG. 3. The driver circuit 256 has one input connected to the output of the comparator circuit and another input connected to the PWM signal at node 243. The output of the driver circuit 256 is coupled to the gate of the free-wheeling synchronous rectifier 116. The driver circuit 256 is responsive to the output signal of comparator 244 and the PWM signal so as to turn off the free-wheeling synchronous rectifier 116 when the output signal is on and so as to enable the PWM signal to control the free-wheeling synchronous rectifier when the output signal is off.

Consequently, the control circuit, and corresponding method, of the converter 200 compare the main clock signal and the gate drive output of a PWM controller in order to recognize a failure condition and to rapidly provide control of the free-wheeling synchronous rectifier 116 so as to prevent large negative current flow through the free-wheeling synchronous rectifier 116 which may otherwise result in component damage.

The converter 200 according to a first embodiment of the present invention has the advantage of providing control of the free-wheeling synchronous rectifier 116 so as to prevent any large negative current flow, and does so in a way that is dependent on the PWM controller gate drive output and independent of timing, current sense signals, voltage sense signals, the current share system, and the operation of the forward synchronous rectifier.

Figure 4:
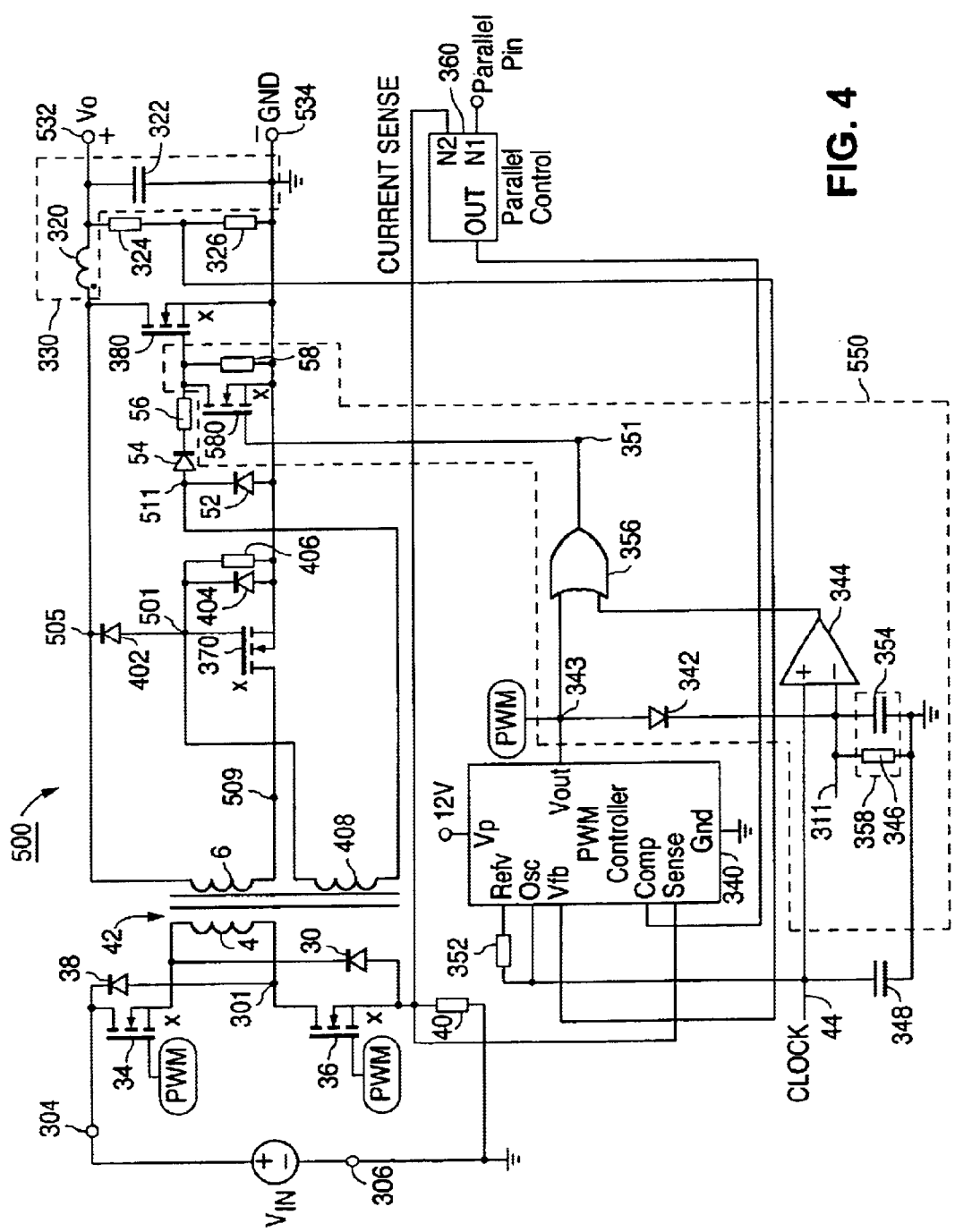
FIG. 4 is a schematic diagram of a forward converter having a control circuit according to a preferred embodiment of the present invention.

FIG. 4 shows a preferred embodiment of the forward converter in a paralleled system of converters and will now be described in further detail. The converter 500 has an input terminal 304 to which an input DC voltage, $V_{in}$, is coupled, relative to a ground potential at an input terminal 306, and an output terminal 532 where the output DC voltage, $V_{OUT}$, of each converter module is provided relative to ground.

As seen in FIG. 4, a power switch 34 is connected to a first end of a primary winding 4 of a transformer 42. Preferably, a power switch 36 is also included and is connected to a second end of a primary winding 4 at a node 301. The power switch 34 is connected in series with the primary winding 4, the power switch 36, and a resistor 40 across the input DC voltage terminals. Preferably, a diode 30 and a diode 38 are included in converter 500. The diode 30 is connected in series with the resistor 40 between the first end of primary winding 4 and the input terminal 306. The diode 38 is connected in series between the second end of primary winding 4 and the input terminal 304. Each of the power switches 34, 36 is preferably a MOSFET having a source, a drain, and a gate.

Power converter 500 includes a PWM controller 340 that provides a pulse width modulated signal (labeled as the "PWM" signal in the figure) that is coupled to each control input of the power switches 34 and 36. The PWM controller 340 is preferably an AS3842 current mode PWM controller having a fixed switching frequency and exemplary input and output pins identified as shown in FIG. 4, though any suitable controller may be used to practice the invention. The pins of the PWM controller 340 are shown in FIG. 4 with exemplary descriptive designators, e.g. "Osc" for the pin also known as the "$R_t/C_t$" pin, known to one of ordinary skill in the art. A DC voltage, preferably 12V, is provided at the "Vp" input of the PWM controller 340. The "Gnd" pin is connected to ground as shown in FIG. 4. A clock signal 44 (source not shown) is coupled to the "Osc" input and, through a resistor 352, to a "Refv" input of the PWM controller 340. A feedback signal, preferably generated by a conventional voltage divider formed by resistors 324 and 326 coupled to the output voltage, $V_o$, of the converter 500 and responsive thereto, is coupled to the "Vfb" input of the PWM controller 340.

On the secondary side of the forward converter 500, transformer 42 has a secondary winding 6. Preferably, the transformer 42 includes an auxiliary secondary winding 408. The secondary winding 6 is coupled to a positive voltage rail at a node 505 and a negative voltage rail at a node 509. A forward rectifier 370 is connected in series between the secondary winding 6, at the node 509, and the secondary side ground. The forward rectifier 370 is preferably a MOSFET having a source, a drain, and a gate. A diode 402 has a cathode connected to node 505 and an anode connected to the gate of the forward rectifier 370, at a node 501. The drain of the forward rectifier 370 is coupled to node 509. The source of the forward rectifier 370 is coupled to the secondary side ground. The forward rectifier 370 provides a forward conduction path between the secondary winding 6 (at node 509) and the second output terminal 534 during the on period of the converter 500. The gate of the forward rectifier 370 is preferably also connected, at a node 501, to a first end of the auxiliary winding 408. A diode 404 and a resistor 406 are connected in parallel between node 501 and the secondary side ground. The diode 404 has an anode connected to the secondary side ground and a cathode connected to node 501. The second end of the auxiliary winding 408 is connected to a node 511.

As seen in FIG. 4, converter 500 includes an output filter 330 having an inductor 320 and a capacitor 322. The inductor 320 is connected in series between node 505 and the output terminal 532. The capacitor 322 is connected across the output terminals 532, 534. The output filter 330 filters out high frequency components of the ripple current present along the positive voltage rail and provides substantially ripple free, substantially constant DC output voltage, $V_o$, across the output terminals 532, 534 of the converter 500. Preferably, the voltage divider formed by a resistor 324 and a resistor 326 is connected in parallel with the capacitor 322 across the output terminals of the converter 500.

A free-wheeling synchronous rectifier 380 having a control input is coupled between node 505 and the secondary side ground. In an exemplary embodiment, the free-wheeling synchronous rectifier 380 is a MOSFET having a source, a drain, and a gate. The drain of the free-wheeling synchronous rectifier 380 is coupled to node 505. The source of the free-wheeling synchronous rectifier 380 is coupled to the secondary side ground. A resistor 56, a diode 54, and a diode 52 are connected in series between the (control input) gate of the free-wheeling synchronous rectifier 380 and the secondary side ground. The resistor 56 is connected in series with the diode 54 between node 511 and the control input gate of the free-wheeling synchronous rectifier 380. The diode 52 has an anode connected to the secondary side ground and a cathode connected to the anode of the diode 54, at node 511. The resistor 56 is connected in series between a cathode of the diode 54 and the gate of the free-wheeling synchronous rectifier 380.

As seen in FIG. 4, converter 500 includes a control circuit 550 connected to the control gate of the free-wheeling synchronous rectifier 380. The control circuit 550 preferably includes a synchronous rectifier 580 having a control input and being coupled between the gate of the free-wheeling synchronous rectifier 380 and the secondary side ground. The synchronous rectifier 580 is preferably a MOSFET having a source, a drain, and a gate. The drain of the synchronous rectifier 580 is coupled to the gate of the free-wheeling synchronous rectifier 380. The source of the synchronous rectifier 580 is connected to the secondary side ground. A resistor 58 is connected between the gate of the free-wheeling synchronous rectifier 380 and the secondary side ground.

The control circuit 550 includes a diode 342 connected in series with a capacitor 354 between a node 343 and ground. The diode 342 has an anode connected to the node 343 and a cathode connected to the capacitor 354, at a node 311. As seen in FIG. 4, control circuit 550 includes a reference circuit 358. The reference circuit 358 preferably includes an RC network formed by a resistor 346 connected in parallel with the capacitor 354 between node 311 and ground. The control circuit 550 includes a comparator 344 having a negative "−" input connected to the diode 342 at the node 311 and a positive "+" input connected to the clock signal 44. The control circuit 550 includes an OR gate 356 having one input connected to the PWM signal at node 343 and another input connected to the output of comparator 344. The output of OR gate 356, at a node 351, is connected to the gate of the synchronous rectifier 580. As seen in FIG. 4, the converter 500 includes a capacitor 348 is connected between the clock signal 44 and ground. The PWM signal output of the PWM controller 340, at the "Vout" pin, is connected to one input of an OR gate 356, at the node 343.

Preferably, the converter 500 is one converter in a system having paralleled power converters (modules), connected preferably as shown in the embodiment in FIG. 2. A parallel control circuit 360 is provided having an input, N1, connected to a "parallel pin" for sensing the shared current at a point where the paralleled converters are interconnected. The parallel control circuit 360 has another input, N2, connected to the junction of the resistor 40, the switch 36, and the diode 30. Thus, the current sensed for power switch 36 in the converter 500 is input to input N2 and the shared current for the parallel connected converters is input to input N1 of the parallel control circuit 360. The output of parallel control circuit 360 is connected to the "Comp" pin of the PWM controller 340. The parallel control circuit 360 is operative to control the "Comp" pin in order to adjust the output signal of the PWM controller 340 in response to a current error detected at the N1 or N2 inputs among the paralleled converters.

The operation of converter 500 will now be described in further detail. Each power switch 34, 36 is alternately switched between an on period and an off period in response to the PWM signal applied to its control gate. The PWM signal is provided by the PWM controller 340. The alternating states cause an AC voltage to be generated across the secondary winding 6 and the auxiliary secondary winding 408 of the transformer 42. As is known to one of ordinary skill in the art, the diodes 30 and 38 connected between the input voltage terminals and the primary winding provide a path for resetting the transformer core when the power switches turn off.

The forward rectifier 370 is turned on by the application of a positive voltage from the auxiliary winding 408 coupled to its control gate at node 501. The gate capacitance of the forward rectifier 370 at node 501 is charged up through diode 52 and auxiliary winding 408 from secondary ground causing the rectifier 370 to turn on. The secondary winding 6 transfers energy to the output terminals 532 and 534 through the conductive path provided by turned-on forward rectifier 370 and inductor 320 when the free-wheeling synchronous rectifier 380 is off.

When the PWM signal at node 343 goes low (inactive), the power switches 34 and 36 are turned off. As a result, the auxiliary secondary winding 408 will reverse polarity and a negative voltage will be coupled to the gate of forward rectifier 370. The gate charge on the forward rectifier 370 discharges through diode 402 and inductor 320 to an output node, causing forward rectifier 370 to turn off. The diode 404 clamps forward rectifier 370 to a voltage at a diode drop below zero so as to prevent the gate from being negative when it is off. When auxiliary secondary winding 408 reverses polarity, node 511 goes positive causing the free-wheeling synchronous rectifier 380 to turn on by applying a signal, through the diode 54 and the resistor 56, to its control gate.

In converter 500, as seen in FIG. 4, the control circuit 550 is operative to rapidly turn-off of the free-wheeling synchronous rectifier 380 when the PWM signal turns off or has missing cycles due to a failure condition. As a result, control circuit 550 prevents a large negative current from flowing in a reverse direction from the output terminals back into the converter through the free-wheeling synchronous rectifier 380. Control circuit 550 provides this control in a way that is dependent only on the gate drive output at node 351 of the PWM controller 340. The control circuit 550 generates a gate drive signal to control the gate of the synchronous rectifier 580. The operation of control circuit 550 will now be described in further detail.

In converter 500, the clock signal 44 is provided by a source (not shown) and is preferably active when the input voltage, $V_{in}$, is applied. The clock signal 44 is preferably a triangular ramp clock signal, but any suitable square clock signal may also be used to practice the invention. The clock signal varies between an upper voltage and a lower voltage and has a frequency equal to or greater than the PWM signal. Preferably, the clock signal varies from 1V to 3V and has a frequency that is twice that of the PWM signal.

Before the PWM controller 340 is turned ON, the PWM signal at node 343 is around zero volts. The PWM signal is coupled through the diode 342 to the inverting input of comparator 344, at node 311, and to the RC network 358, formed by the resistor 346 and the capacitor 354. The PWM reference signal at node 311 is a function of the PWM signal and the time constant of the RC network 358.

When the PWM reference signal is at around zero volts, the output of the comparator 344 will be at a "high" state since the clock signal 44 at its non-inverting "+" input pin will be higher than the PWM reference signal at node 311 at the inverting "−" input of comparator 344. A high state at the output of the comparator 344 causes the output of the OR gate 356 to also be at a high state. The high state at the output of the OR gate 356, at node 351, causes the synchronous rectifier 580 to turn on which in turn switches off the free-wheeling synchronous rectifier 380.

Figure 8:
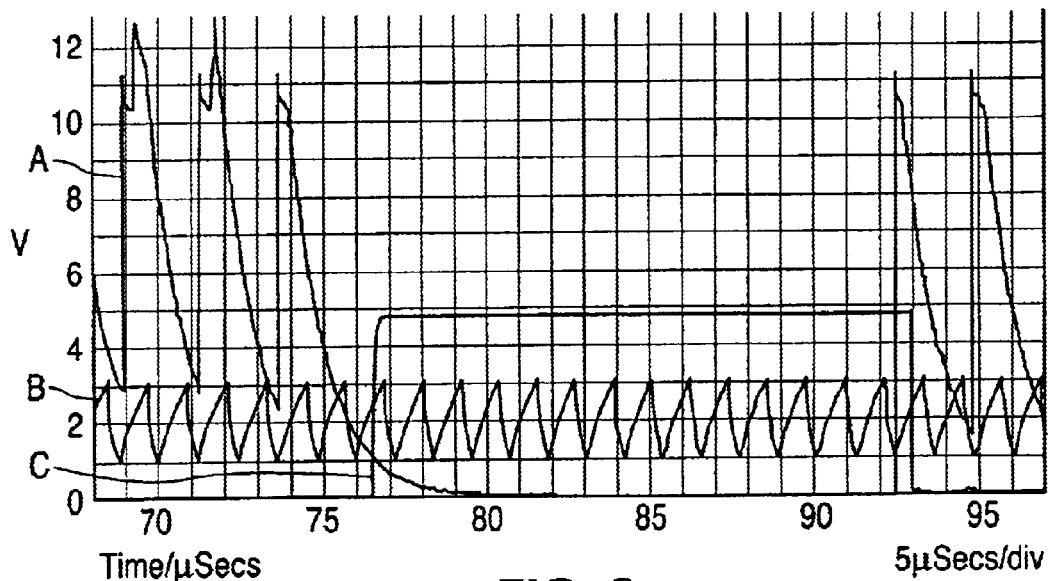
FIG. 8 is a timing diagram showing selected voltage waveforms which illustrate the operation of a converter according to an embodiment of the present invention.
Figure 9:
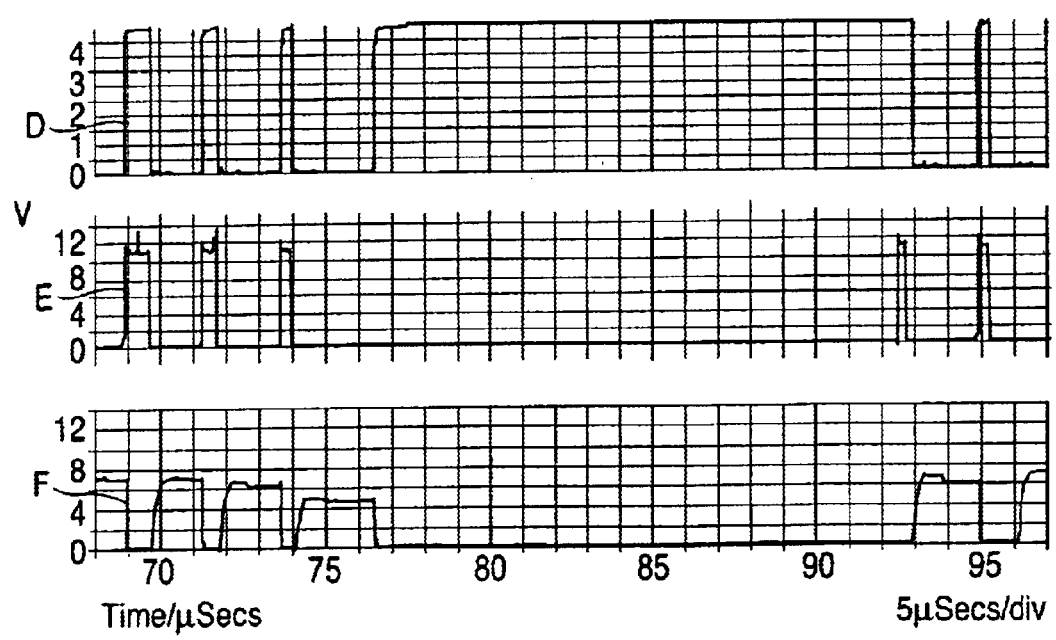
FIG. 9 is a timing diagram showing additional selected voltage waveforms which illustrate the operation of a converter according to an embodiment of the present invention.

FIGS. 8 and 9 are exemplary timing diagrams illustrating the operation of converter 500, in particular, the operation of control circuit 550 for a condition when the PWM signal turns off. Trace A illustrates the voltage of the PWM reference signal at node 311 as a function of time. Trace B illustrates the voltage for the clock signal 44 as a function of time. Trace C illustrates the voltage at the output of comparator 344 as a function of time. Trace D illustrates the voltage for the output of the OR gate 356, connected to the gate of synchronous rectifier 580, as a function of time. Trace E illustrates the voltage for the PWM signal, at node 343, as a function of time. Trace F illustrates the voltage at the control gate of the free-wheeling synchronous rectifier 380.

The time before the PWM controller 340 is turned on will now be described in further detail with reference to FIGS. 8 and 9, in particular, with reference to the range of about 80 µs to about 92 µs on the time axis. During this time, since the PWM controller is off, the PWM signal is at a low level. Consequently, the PWM reference signal will be at around zero volts. As seen, in Trace B, preferably, the clock signal varies from about 1V to 3V and has a frequency that is twice that of the PWM signal. As a result, the output of the comparator 344 (shown in Trace C) will be at a "high" state since the clock signal 44 (shown in Trace B) at its non-inverting "+" input pin will be higher than the PWM reference signal (shown in Trace A) at node 311 and at the inverting "–" input of comparator 344. A high state at the output of the comparator 344 causes the output of the OR gate 356 (shown in Trace D) to also be at a high state. The high state at the output of the OR gate 356, at node 351, causes the synchronous rectifier 580 to turn on which in turn switches off the free-wheeling synchronous rectifier 380. As can be seen in Trace F, the gate of the free-wheeling synchronous rectifier 380 is low during this time. At this time, with the PWM controller off, the free-wheeling synchronous rectifier 380 remains off due to the synchronous rectifier 580 being on, and the converter 500 is off. The resistor 58 is preferably provided for discharging the gate of free-wheeling synchronous rectifier 380 after the control gate signal is no longer provided.

Once the PWM controller 340 turns on, the PWM signal at node 343 goes to a high state. As a result, the inverting pin of comparator, at node 311, will rise up very fast due to diode 342, as shown in Trace A starting at about 92.5 µs on the time axis. The component values for the RC network 358 are chosen so that the PWM reference signal at node 311 discharges slowly at a predetermined rate so that a voltage level higher than the peak voltage of the clock signal is maintained for a predetermined period of time, as shown in Trace A. As a result, the output of comparator 344, shown at Trace C, after a delay determined by the comparator device characteristics, goes to a low state. Thus, at this stage the output of the OR gate 356, preferably a fast device such as the 74HCT32, will follow the state of the PWM signal at node 343. At this stage, of about 92.5 µs on the time axis, the operation of the converter 500 is normal, without any fault condition. For FIGS. 8 and 9, this normal operation continues until approximately the 97 µs point, at which point, the timing diagram wraps around to the left, with the normal operation shown continuing from about 68 µs. It would be known to one of ordinary skill in the art, that, during this stage, depending on the values of the RC network 358, the output of the comparator 344 could be a narrow pulse, which does not affect the operation as long as the pulse is close to the rising edge of the PWM signal and smaller than the minimum duty cycle of the PWM signal.

During operation of the converter 500, a failure condition might occur wherein the PWM signal is missing cycles or is turned off. An exemplary failure condition is illustrated in FIGS. 8 and 9, at about 76 µs on the time scale. At the time that the first cycle of the PWM signal is missed, the clock signal 44 (shown in Trace B) is still swinging from 1V to 3V, but the trailing edge of the PWM reference signal (shown in Trace A), at node 311 and at the inverting input of comparator 344, will be discharged at a predetermined rate due to RC network 358. The RC network 358 causes the trailing edge of the PWM signal at node 343 to decrease in voltage at a predetermined rate such that the PWM reference signal (shown in Trace A), at node 311, drops below and remains below the lower voltage of the clock signal 44 if the next pulse of the PWM signal (Trace E) has not been generated. As a result, the output of the comparator 344 will go to a "high" state during the next clock signal, as shown in Trace C, which causes the output of the OR gate 356 to go high, as shown in Trace D, which in turn, causes the synchronous rectifier 580 to turn on, thereby causing the free-wheeling synchronous rectifier 380 to turn off. As can be seen in Trace F, the gate of the free-wheeling synchronous rectifier 380 is controlled to turn off the free-wheeling synchronous rectifier 380 preferably within one cycle of clock signal 44.

Thus, the output signal of the comparator 344 is on when the PWM reference signal, at node 311, is below the lower voltage of the clock signal 44. The control circuit 550 is operative so as to turn off the free-wheeling synchronous rectifier 380 when the output signal of the comparator 344 is on and so as to enable the PWM signal, at node 343, to control the free-wheeling synchronous rectifier 380 when the output signal of the comparator 344 is off. The output signal of the comparator 344 is on when the PWM reference signal, at node 311, is below the lower voltage of the clock signal 44.

In the beginning of the first missing cycle of the PWM signal, the output of OR gate 356, as shown in Trace D, will immediately go to a "low" state and the gate of the free-wheeling synchronous rectifier 380 will be in a high state, as shown in Trace F, because the synchronous rectifier 580 is in an off state which keeps the control gate of the free-wheeling synchronous rectifier 380 in an undischarged state. The free-wheeling synchronous rectifier 380 will complete the release of the energy of inductor 320. Once the energy of the inductor 320 has all been released, the phase of the inductor 320 changes to make current flow from the output to the free-wheeling rectifier 380 Thus, if the free-wheeling synchronous rectifier 380 is not turned off quickly enough, a huge negative current would flow through the free-wheeling synchronous rectifier 380.

By turning the free-wheeling synchronous rectifier off in about one cycle after the PWM signal stops (see the range of 72 µs to 77 µs for the exemplary waveforms in FIGS. 8 and 9), the circuit and corresponding method embodiments according to the present invention prevent any huge negative current flow through the free-wheeling synchronous rectifier and damage to the circuit components that might have otherwise resulted therefrom.

Figure 5:
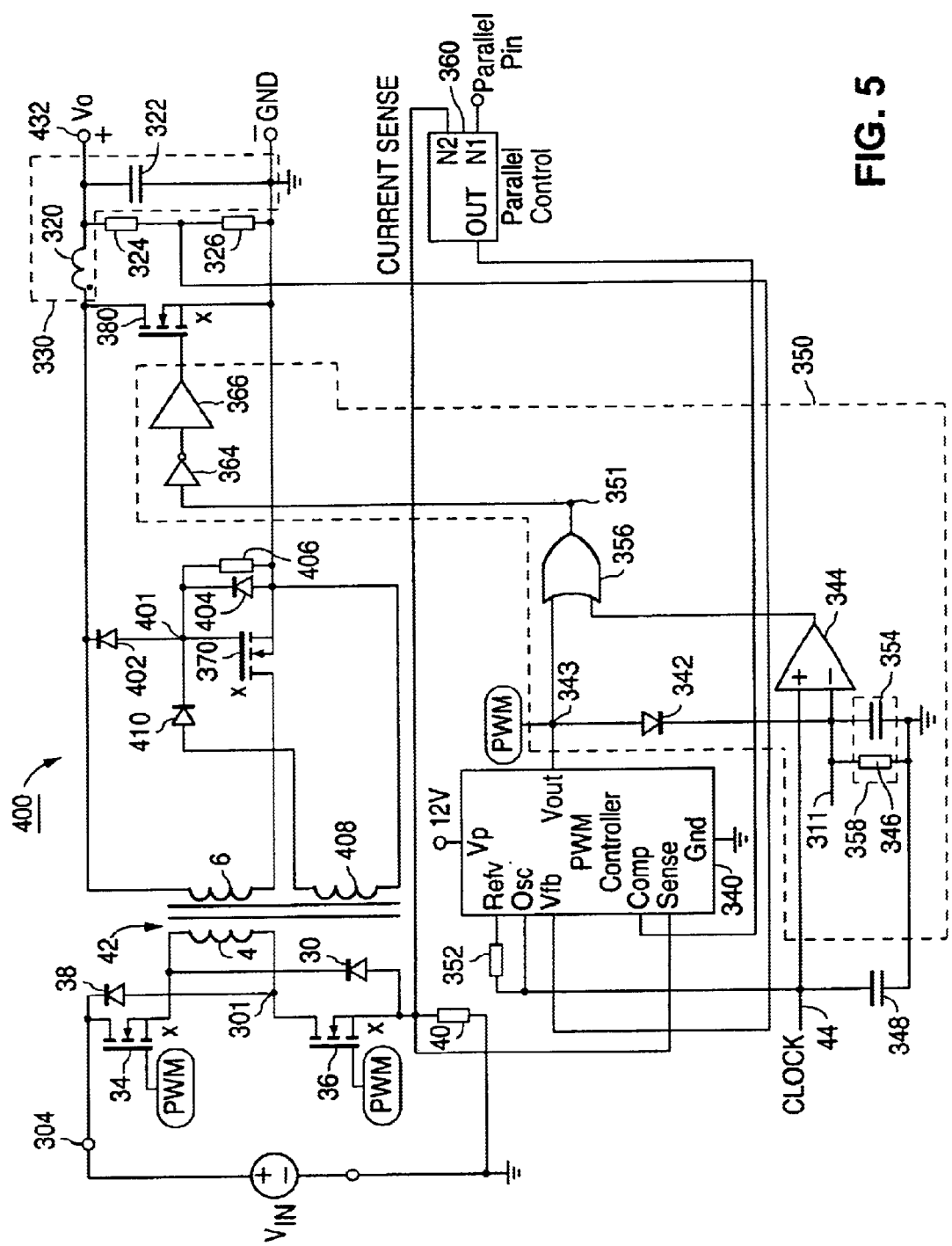
FIG. 5 is a schematic diagram of a forward converter having a control circuit and providing a mixed synchronous rectifier drive control according to a third embodiment of the present invention.

FIG. 5 is a schematic diagram of a forward converter having a control circuit and providing a mixed synchronous rectifier drive control according to a third embodiment of the present invention. For the forward converter 400, the drive for the control gate of the forward rectifier 406 is as shown for a preferred embodiment in FIG. 4. The main difference between the embodiment illustrated in FIG. 5 and a preferred embodiment illustrated in FIG. 4 is the control circuit, specifically the connection to the gate of the free-wheeling synchronous rectifier 380. In converter 400, a control circuit 350 includes a series combination of an inverter 364 and buffer 366 coupled between the output of the OR gate 356 and the gate of the free-wheeling synchronous rectifier 380.

In addition, the auxiliary winding 408 in FIG. 4 is used to drive the gates of the forward rectifier 370 and free-wheeling synchronous rectifier 380. As a result, the charging energy of the forward rectifier 370 can be used for part of output (Vo) energy or to charge up the gate of the free-wheeling rectifier 380, thereby creating still higher efficiency. In FIG. 5, by contrast, the auxiliary winding 408 is used to drive the gate of the forward rectifier 370 only. A diode 410 is included in the embodiment in FIG. 5 to block the charging energy flowing to the secondary ground when auxiliary winding 408 is reversing polarity in order to use up the energy for output (Vo), thereby causing higher efficiency.

Figure 6:
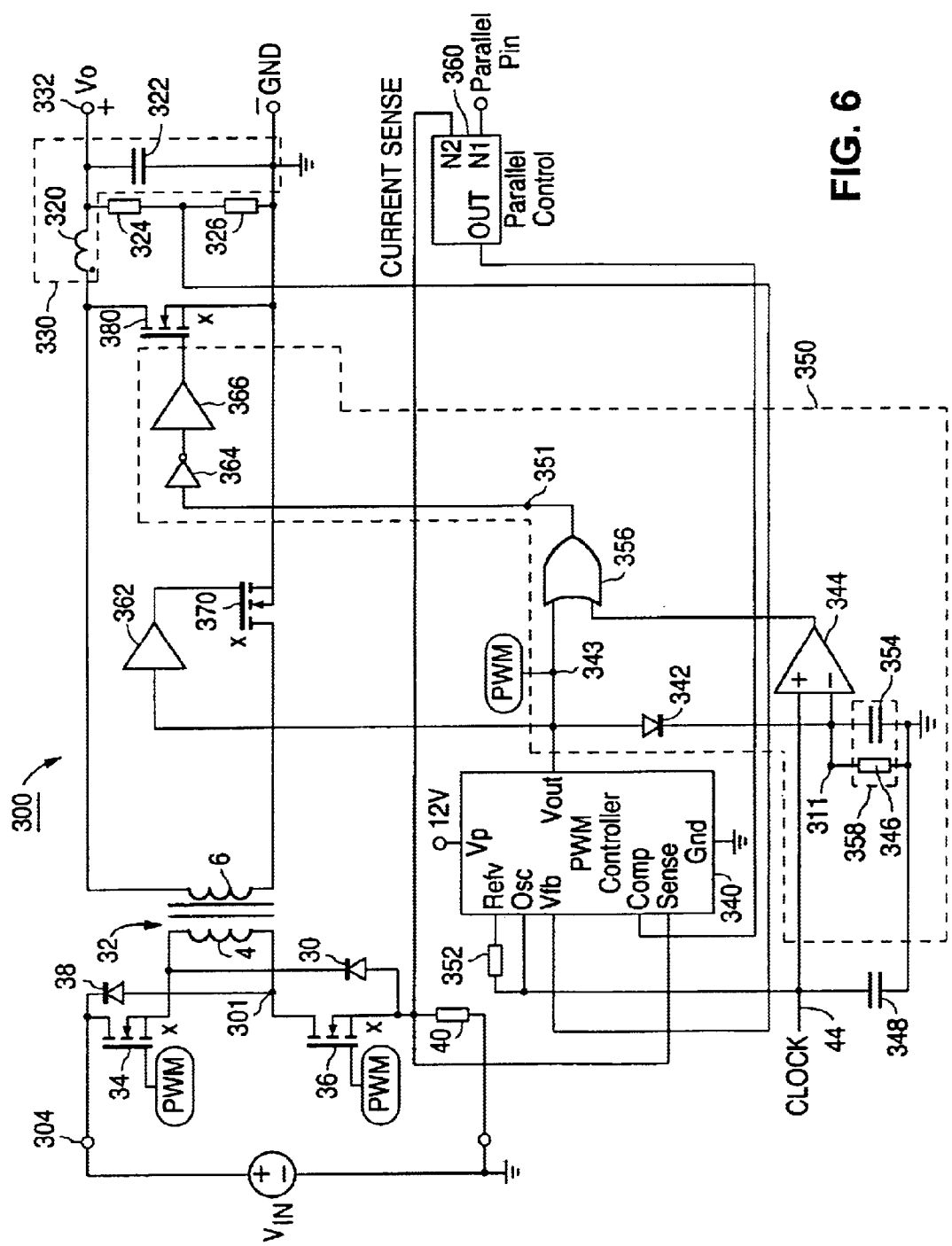
FIG. 6 is a schematic diagram of a forward converter having a control circuit and providing a buffer gate drive control for both the free-wheeling synchronous rectifier and the forward rectifier according to a fourth embodiment of the present invention.

FIG. 6 is a schematic diagram of a forward converter 300 having a control circuit 350 and providing a buffer gate drive control for both the free-wheeling synchronous rectifier and the forward rectifier according to a fourth embodiment of the present invention. The differences between the embodiment illustrated in FIG. 6 and the embodiment illustrated in FIG. 5, relate to the drive for the gate of the forward rectifier. In particular, the converter 300 does not require the auxiliary secondary winding 408 of FIG. 5. As seen in FIG. 6, the PWM signal from the control circuit 350 is coupled to the control gate of the forward rectifier 370 through a buffer 362.

Figure 7:
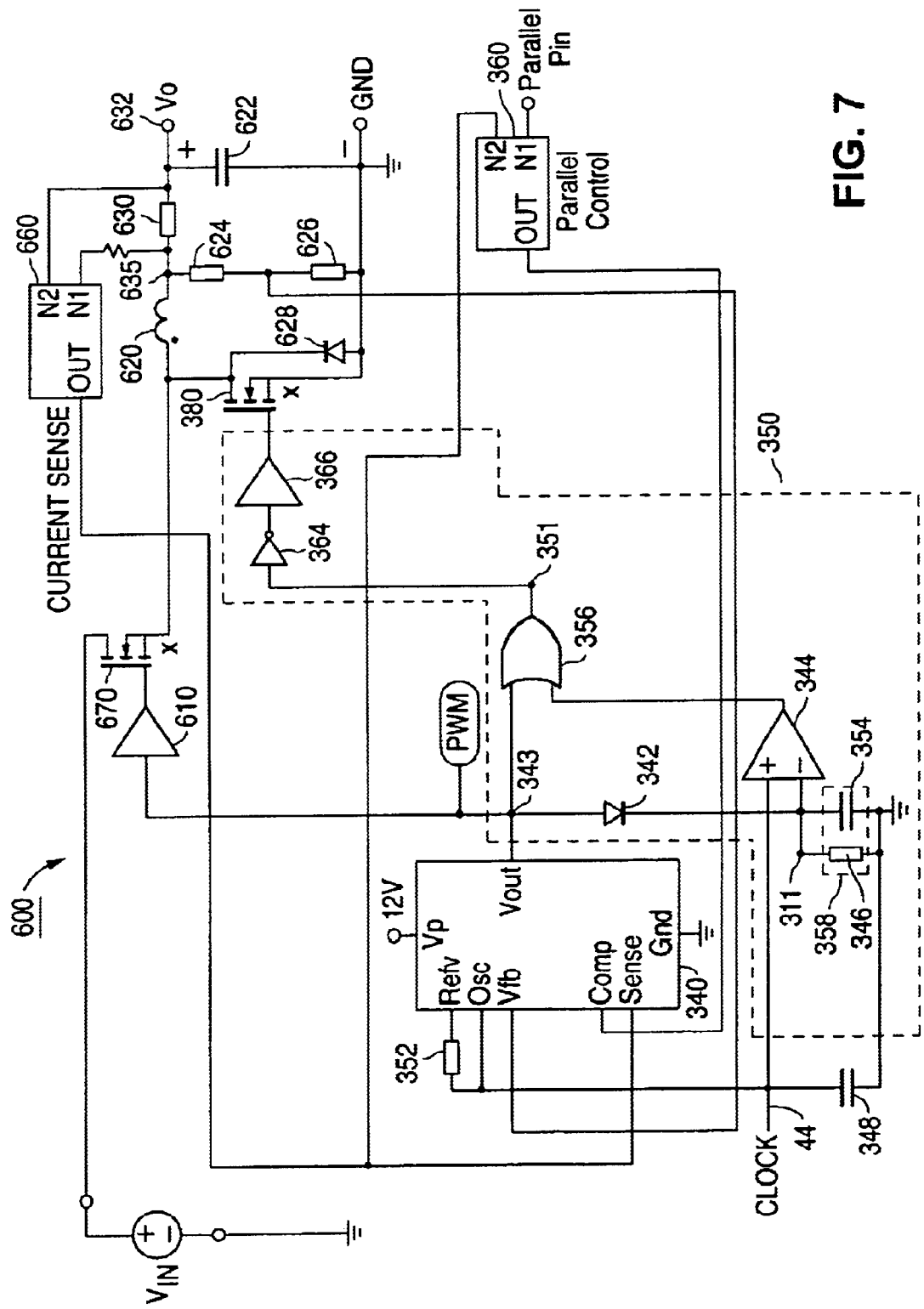
FIG. 7 is a schematic diagram of a buck converter having a circuit according to a fifth embodiment of the present invention.

FIG. 7 is a schematic diagram of a buck converter according to a fifth embodiment of the present invention. As seen in FIG. 7, the buck converter 600 includes the control circuit 350 having a PWM signal, at node 343, coupled to the control input of a switch 670. Switch 670 is preferably a forward synchronous rectifier MOSFET having a gate, a source, and a drain. The switch 670 is connected between an input terminal to which the input voltage, $V_{in}$, is coupled, and an inductor 620. The inductor 620 is connected in series with a resistor 630 between an output terminal 632 and the source of the switch 670.

As seen in FIG. 7, in converter 600, the source of the free-wheeling synchronous rectifier 380 is connected to ground, and the drain is connected to the junction of the inductor 620 and the source of the switch 670. A diode 628 has an anode connected to ground and a cathode connected to the drain of the free-wheeling synchronous rectifier 380. The converter 600 includes a voltage divider formed by resistors 624 and 626 coupled to the output voltage, $V_o$, of the converter 600 and responsive thereto, and a capacitor 622. The voltage divider formed by the resistors 624 and 626 is connected, at a node 635, in series with the inductor 620 between the drain of the free-wheeling synchronous rectifier 380 and ground. A feedback signal, preferably generated by the voltage divider formed by resistors 624 and 626 is coupled to the "Vfb" input of the PWM controller 340. The resistor 630 is connected in series between node 635 and the output terminal 632 to which is coupled the output voltage, $V_o$, relative to ground. A capacitor 622 is connected across the output terminals of buck converter 600.

As seen in FIG. 7, the converter 600 includes a current sense circuit 660 having two inputs, identified as N1 and N2, connected across the resistor 630. The current sense circuit 660 has an output connected to the sense pin of the PWM controller 340. A parallel control circuit 360 is provided for an embodiment having converters connected in parallel. The parallel control circuit 360 has a first input, N2, connected to the output of the current sense circuit 660. A second input, N1, of the parallel control circuit 660 is connected to a "parallel pin" for sensing the shared current at a point, for a parallel converter embodiment, where the paralleled converters are interconnected. The parallel control circuit 360 has another input, N2, connected to the output of the current sense circuit 660 and an output connected to the "Comp" pin of the PWM controller 340.

In operation, when the switch 670 of converter 600 is switched on by the PWM signal, the capacitor 622 is charged via switch 670, inductor 620, and resistor 632 from the input voltage, $V_{in}$, to produce the output voltage, $V_o$, which is consequently less than the peak input voltage, $V_{in}$. When switch 670 is open, current through the inductor 620 is maintained via the free-wheeling synchronous rectifier 380. The synchronous rectifier 380 permits bi-directional current flow. As a result, inductor current from inductor 620 can flow in reverse through the free-wheeling synchronous rectifier 380 from the output. The output of OR gate 356, at node 351, of the control circuit 350 is coupled to the control gate of the free-wheeling synchronous rectifier 370 through a series combination of an inverter 364 and a buffer 366.

During operation of the converter 600, if a failure condition occurs wherein the PWM signal is missing cycles or is turned off, the output of the comparator 344 will go high during the next clock signal, as described above, which causes the output of the OR gate 356 to go high, which in turn causes the free-wheeling synchronous rectifier 380 to turn off. Thus, a large negative current flow through the free-wheeling synchronous rectifier 380 is prevented.

It would be appreciated by one skilled in the art that the components shown for the control circuit according to the above embodiments of the present invention could be easily integrated into an integrated circuit, for example, a PWM ASIC design.

Consequently, the embodiments of the present invention have the advantage of providing control of the free-wheeling synchronous rectifier so as to prevent any large negative current flow, and by doing so in a way that is dependent on the output of the PWM controller and independent of timing, current sense signals, voltage sense signals, the current share system, and the operation of the forward synchronous rectifier.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. A forward converter, comprising:
    a transformer having a primary winding and a secondary winding;
    a power switch connected in series with said transformer and coupled to an input power source, said power switch capable of being alternately switched between an on period and an off period as a function of a PWM signal comprising pulses generated by a PWM circuit and such that an AC voltage is generated across said secondary winding in response thereto;
    an output filter operative to provide a substantially constant DC voltage to an output load;
    a forward rectifier having a control input and being operative to provide a forward conduction path between said secondary winding and said output filter during said on period;
    a free-wheeling synchronous rectifier having a control input and being operative to provide a second conduction path for maintaining current to said output filter during said off period; and
    a control circuit coupled to said control input of said free-wheeling synchronous rectifier for controlling the state thereof, said control circuit receiving a clock signal varying between an upper voltage and a lower voltage and having a frequency equal to or greater than said PWM signal, comprising:
        a reference circuit for generating a PWM reference signal by causing the trailing edge of said PWM signal to decrease in voltage at a predetermined rate such that said PWM reference signal drops below and remains below said lower voltage if the next pulse of said PWM signal has not been generated;

a comparator circuit for comparing said PWM reference signal to said clock signal and for generating an output signal as a function thereof such that said output signal is on when said PWM reference signal is below said lower voltage; and a driver circuit responsive to said output signal and said PWM signal so as to turn off said free-wheeling synchronous rectifier when said output signal is on and so as to enable said PWM signal to control said free-wheeling synchronous rectifier when said output signal is off.

2. The forward converter of claim 1, wherein said reference circuit is for generating a PWM reference signal by causing the trailing edge of said PWM signal to decrease in voltage at a predetermined rate such that said PWM reference signal drops below and remains below said lower voltage if the leading edge of the next pulse of said PWM signal has not been generated.

3. The forward converter of claim 1, wherein if said PWM reference signal drops below and remains below said lower voltage of said clock signal, said driver circuit turns off said free-wheeling synchronous rectifier within one cycle of said clock signal after said PWM reference signal drops below said lower voltage.

4. The forward converter of claim 1, wherein said reference circuit is for generating a PWM reference signal by causing the trailing edge of said PWM signal to decrease in voltage at a predetermined rate such that said PWM reference signal drops below and remains below the amplitude of said clock signal if the next pulse of said PWM signal has not been generated.

5. The forward converter of claim 4, wherein if said PWM reference signal drops below and remains below the amplitude of said clock signal, said driver circuit turns off said free-wheeling synchronous rectifier within one cycle of said clock signal after said PWM reference signal drops below the amplitude of said clock signal.

6. The forward converter of claim 1, wherein said clock signal varies from 1 volt to 3 volts.

7. The forward converter of claim 1, wherein said clock signal has a frequency that is about twice that of said PWM signal.

8. The forward converter of claim 1, wherein, said free-wheeling synchronous rectifier is a MOSFET.

9. The forward converter of claim 1, wherein said reference circuit comprises:

a first diode coupled between the output of said PWM circuit and a first node, and an RC circuit for causing the trailing edge of said PWM signal to decay at a predetermined rate according to a predetermined RC time constant such that said PWM reference signal drops below and remains below said lower voltage if the next pulse of said PWM signal has not been generated, said RC circuit comprising a first resistor connected in parallel with a first capacitor between said first node and ground.

10. The forward converter of claim 1, wherein said comparator circuit comprises a comparator having a positive input and a negative input, said PWM reference signal being coupled to said negative input and said clock signal being coupled to said positive input.

11. The forward converter of claim 1, further comprising a voltage divider coupled across the output of said converter for generating a feedback signal responsive thereto, said feedback signal being coupled to said PWM circuit.

12. The forward converter of claim 1, wherein said driver circuit comprises:

an OR gate having a first and second input and an output, said first input being coupled to the output of said PWM controller, said second input being coupled to the output of said comparator circuit.

13. The forward converter of claim 12, said driver circuit further comprising:

an inverter and a buffer connected in series between the output of said OR gate and said control input of said free-wheeling synchronous rectifier.

14. The forward converter of claim 12, wherein said output filter comprises an inductor in series with a capacitor, said capacitor being connected across the output of said converter, and wherein said free-wheeling synchronous rectifier is a MOSFET having a source, drain and gate, the drain of said free-wheeling synchronous rectifier is coupled to said inductor, the source of said free-wheeling synchronous rectifier is coupled to ground; said driver circuit further comprising:

a driver rectifier coupled between the control input of said free-wheeling synchronous rectifier and ground and having a control input coupled to said output of said OR gate.

15. The forward converter of claim 14, said driver circuit further comprising a resistor connected in series between the control input of said free-wheeling synchronous rectifier and ground.

16. The forward converter of claim 1, wherein said power switch is a first power switch and said primary winding having a first end and a second end, said forward converter further comprising a second power switch, said first power switch connected in series between said first end and one of said input terminals, said second power switch connected in series through a resistor between said second end and the other of said input terminals; a first diode connected in series with said resistor between said first end and the other of said input terminals; a second diode connected in series between said second end and the first one of said input terminals, such that said first and second diodes provide a path for resetting said transformer.

17. The forward converter of claim 1, further comprising an auxiliary winding magnetically coupled to said primary winding such that said AC voltage is generated across said auxiliary winding in response to the switching of said power switch, one end of said auxiliary winding being coupled through a first diode to the control input of said forward rectifier and the other end of said auxiliary winding being coupled to ground; a second diode coupled between the junction of said output filter and said secondary winding and the control input of said forward rectifier; and a third diode and a resistor connected in parallel between the control input of said forward rectifier and ground.

18. The forward converter of claim 1, wherein said free-wheeling synchronous rectifier is a MOSFET having a source, a drain and a gate, the drain of said free-wheeling synchronous rectifier being coupled to said output filter, the source of said free-wheeling synchronous rectifier being coupled to ground; said forward converter further comprising a second resistor and a fourth and fifth diode connected in series between the control input of said free-wheeling synchronous rectifier and ground, the second resistor connected in series with the fourth diode between a second node and the control input of said free-wheeling synchronous rectifier, said fifth diode having an anode connected to ground and a cathode connected to the anode of the fourth diode at said second node, and a third resistor connected between the control input of said free-wheeling synchronous rectifier and ground, an auxiliary winding magnetically coupled to said primary winding such that said AC voltage is generated across said auxiliary winding in response the switching of said switch, one end of said auxiliary winding being coupled to the control input of said forward rectifier and the other end of said auxiliary winding being coupled to said second node, a sixth diode coupled between the junction of said inductor and said secondary winding and the control input of said forward rectifier, a seventh diode and a fourth resistor connected in parallel between the control input of said forward rectifier and ground.

19. A buck converter for converting said input DC voltage to a regulated output DC voltage, said buck converter having an input terminal to which an input DC voltage is coupled and an output terminal where the output DC voltage is provide, comprising:

an output filter operative to provide a substantially constant DC voltage to an output load;

a power switch connected in series between said input terminal and said output filter; said power switch capable of being alternately switched between an on period and an off period as a function of a PWM signal comprising pulses generated by a PWM circuit;

a free-wheeling synchronous rectifier having a control input and being operative to provide a second conduction path for maintaining current to said output filter during said off period;

a control circuit coupled to said control input of said free-wheeling synchronous rectifier for controlling the state thereof, said control circuit receiving a clock signal varying between an upper voltage and a lower voltage and having a frequency equal to or greater than said PWM signal, comprising:

a reference circuit for generating a PWM reference signal by causing the trailing edge of said PWM signal to decrease in voltage at a predetermined rate such that said PWM reference signal drops below and remains below said lower voltage if the next pulse of said PWM signal has not been generated;

a comparator circuit for comparing said PWM reference signal to said clock signal and for generating an output signal as a function thereof such that said output signal is on when said PWM reference signal is below said lower voltage; and a driver circuit responsive to said output signal and said PWM signal so as to turn off said free-wheeling synchronous rectifier when said output signal is on and so as to enable said PWM signal to control said free-wheeling synchronous rectifier when said output signal is off.

20. The buck converter of claim 19, further comprising a voltage divider coupled across the output of said converter for generating a feedback signal responsive thereto, said feedback signal being coupled to said PWM circuit.

21. The buck converter of claim 19, said driver circuit further comprising an inverter and a buffer connected in series between the output of said OR gate and said control input of said free-wheeling synchronous rectifier.

22. A power converter comprising:

a power switch capable of being alternately switched between an on period and an off period as a function of a PWM signal comprising pulses generated by a PWM circuit;

an output filter operative to provide a substantially constant DC voltage to an output load;

a synchronous rectifier having a control input and being operative to provide a second conduction path for maintaining current to said output filter during the off period of said converter; and a control circuit coupled to said control input of said free-wheeling synchronous rectifier for controlling the state thereof, said control circuit receiving a clock signal varying between an upper voltage and a lower voltage and having a frequency equal to or greater than said PWM signal, comprising:

a reference circuit for generating a PWM reference signal by causing the trailing edge of said PWM signal to decrease in voltage at a predetermined rate such that said PWM reference signal drops below and remains below said lower voltage if the next pulse of said PWM signal has not been generated, a comparator circuit for comparing said PWM reference signal to said clock signal and for generating an output signal as a function thereof such that said output signal is on when said PWM reference signal is below said lower voltage, and a driver circuit responsive to said output signal and said PWM signal so as to turn off said free-wheeling synchronous rectifier when said output signal is on and so as to enable said PWM signal to control said free-wheeling synchronous rectifier when said output signal is off.

23. A method of controlling the state of a synchronous rectifier in a power converter, said power converter having an input terminal to which an input DC voltage is coupled and an output terminal where the output DC voltage is provided, comprising the steps of:

receiving a PWM signal from a PWM controller;

receiving a clock signal varying between an upper voltage and a lower voltage and having a frequency equal to or greater than said PWM signal;

generating a PWM reference signal by causing the trailing edge of said PWM signal to decrease in voltage at a predetermined rate such that said PWM reference signal drops below and remains below said lower voltage if the next pulse of said PWM signal has not been generated;

generating an output signal as a function of said PWM reference signal and said clock signal such that said output signal is on when said PWM reference signal is below said lower voltage;

turning off said free-wheeling synchronous rectifier when said output signal is on; and enabling said PWM signal to control said free-wheeling synchronous rectifier when said output signal is off.

24. A power system having a plurality of DC-DC converter modules, each having an input terminal to which an input DC voltage is coupled and an output terminal where the output DC voltage is provided, said converter modules being connected in parallel through their output terminals, each said converter module comprising:

a buck converter for converting said input DC voltage to a regulated output DC voltage, said buck converter having an input terminal to which an input DC voltage is coupled and an output terminal where the output DC voltage is provide, said buck converter comprising an output filter operative to provide a substantially constant DC voltage to an output load, a power switch connected in series between said input terminal and said output filter, said power switch capable of being alternately switched between an on period and an off period as a function of a PWM signal comprising pulses generated by a PWM circuit, a free-wheeling synchronous rectifier having a control input and being operative to provide a second conduction path for maintaining current to said output filter during said off period, a voltage divider coupled across the output of said converter for generating a feedback signal responsive thereto, said feedback signal being coupled to said PWM circuit, and a control circuit coupled to said control input of said free-wheeling synchronous rectifier for controlling the state thereof, said control circuit receiving a clock signal varying between an upper voltage and a lower voltage and having a frequency equal to or greater than said PWM signal, said control circuit comprising a reference circuit for generating a PWM reference signal by causing the trailing edge of said PWM signal to decrease in voltage at a predetermined rate such that said PWM reference signal drops below and remains below said lower voltage if the next pulse of said PWM signal has not been generated, a comparator circuit for comparing said PWM reference signal to said clock signal and for generating an output signal as a function thereof such that said output signal is on when said PWM reference signal is below said lower voltage, and a driver circuit responsive to said output signal and said PWM signal so as to turn off said free-wheeling synchronous rectifier when said output signal is on and so as to enable said PWM signal to control said free-wheeling synchronous rectifier when said output signal is off;

a current sense circuit, coupled to each said converter module, for detecting the output current of said converter module and for generating a current sense signal that is a function thereof;

a parallel sense circuit for generating a current share signal at a common current sharing bus that is a function of each of said current sense signals; and a parallel control circuit coupled to said PWM circuit of each said converter module for adjusting the output power of that respective converter module as a function of that converter module's current sense signal and said current share signal.

25. A power system having a plurality of DC-DC converter modules, each having an input terminal to which an input DC voltage is coupled and an output terminal where the output DC voltage is provided, said converter modules being connected in parallel through their output terminals, each said converter module comprising:

a forward converter for converting said input DC voltage to a regulated output DC voltage comprising a transformer having a primary winding and a secondary winding, a power switch connected in series with said transformer and coupled to an input power source, said power switch capable of being alternately switched between an on period and an off period as a function of a PWM signal comprising pulses generated by a PWM circuit and such that an AC voltage is generated across said secondary winding in response thereto, an output filter operative to provide a substantially constant DC voltage to an output load, a forward rectifier having a control input and being operative to provide a forward conduction path between said secondary winding and said output filter during said on period, a free-wheeling synchronous rectifier having a control input and being operative to provide a second conduction path for maintaining current to said output filter during said off period, a voltage divider coupled across the output of said converter for generating a feedback signal responsive thereto, said feedback signal being coupled to said PWM circuit, a control circuit coupled to said control input of said free-wheeling synchronous rectifier for controlling the state thereof, said control circuit receiving a clock signal varying between an upper voltage and a lower voltage and having a frequency equal to or greater than said PWM signal, said control circuit comprising a reference circuit for generating a PWM reference signal by causing the trailing edge of said PWM signal to decrease in voltage at a predetermined rate such that said PWM reference signal drops below and remains below said lower voltage if the next pulse of said PWM signal has not been generated, a comparator circuit for comparing said PWM reference signal to said clock signal and for generating an output signal as a function thereof such that said output signal is on when said PWM reference signal is below said lower voltage, and a driver circuit responsive to said output signal and said PWM signal so as to turn off said free-wheeling synchronous rectifier when said output signal is on and so as to enable said PWM signal to control said free-wheeling synchronous rectifier when said output signal is off;

a current sense circuit, coupled to each said converter module, for generating a current sense signal as a function of the current sensed through said power switch;

a parallel sense circuit for generating a current share signal at a common current sharing bus that is a function of each of said current sense signals; and a parallel control circuit coupled to said PWM circuit of each said converter module for adjusting the output power of that respective converter module as a function of that converter module's current sense signal and said current share signal.

* * * * *